United States Patent [19]

Nagao et al.

[11] Patent Number: 4,620,677

[45] Date of Patent: Nov. 4, 1986

[54] SEAT BELT RETRACTOR

[75] Inventors: Kosuke Nagao; Shuzo Ishii; Noriyasu Shinka; Yoshihiro Maeno; Naoki Morita, all of Osaka, Japan

[73] Assignee: Ashimori Industry Co., Ltd., Osaka, Japan

[21] Appl. No.: 689,684

[22] Filed: Jan. 8, 1985

[51] Int. Cl.⁴ .............................................. B60R 22/34
[52] U.S. Cl. .................... 242/107.6; 280/807
[58] Field of Search ............ 242/107.6, 107.7, 107.12; 280/807, 808, 806; 297/475-480

[56] References Cited

U.S. PATENT DOCUMENTS

| | | | |
|---|---|---|---|
| 4,172,568 | 10/1979 | Yamanashi et al. | 242/107.6 |
| 4,199,172 | 4/1980 | Fukunaga | 242/107.6 X |
| 4,228,971 | 10/1980 | Arima et al. | 242/107.6 |
| 4,456,196 | 6/1984 | Takada et al. | 242/107.6 |
| 4,467,982 | 8/1984 | Tajima et al. | 242/107.6 |
| 4,494,709 | 1/1985 | Takada | 242/107.6 |

Primary Examiner—John M. Jillions
Attorney, Agent, or Firm—Birch, Stewart, Kolasch & Birch

[57] ABSTRACT

A seat belt retractor including a main body, a spindle rotatably journaled to the main body having a seat belt wound around the outer periphery thereof, a stopper having teeth formed at the top end thereof for engaging with external gear to inhibit the rotation of the external gear, a solenoid plunger associated with a switch in buckle parts fitted to the seat belt, a friction plate having a pair of spaced first and second projections and a recess formed therebetween with an inclined edge for controlling the movement of the stopper in such manner that, when the solenoid plunger is not actuated, the stopper is located in a non-engaging position to the external gear to enable freely pulling out and rewinding of the seat belt. When the solenoid plunger is actuated by the operation of the buckle parts, the first projection or the inclined edge of the friction plate inhibits the stopper from engaging with the external gear to allow the rewinding of any slack of the pulled out seat belt. When the seat belt is again pulled out in this state, the stopper engages with the external gear to inhibit the spindle from rotating in the belt-rewinding direction, but permits the rotation in the direction of pulling out the seat belt while tightening the auxiliary spring.

14 Claims, 9 Drawing Figures

SEAT BELT RETRACTOR

BACKGROUND OF THE INVENTION

1. Field of the Invention

The present invention relates to a seat belt retractor provided with a belt tension eliminating mechanism capable of relieving belt wearers from body-squeezing tension. More particularly, the present invention relates to a seat belt retractor provided with an improved belt tension eliminating mechanism which enables freely protracting the seat belt under normal seating conditions so as to relieve the belt wearer from body-squeezing pressure caused by tension of the belt and retracting an excess length of the seat belt to the memory position previously determined by pulling out the seat belt slightly after the seat occupant fastens it.

2. Description of the Prior Art

In recent years, the use of a seat belt has legally been required for seat occupants in automobiles in many countries for the purpose of preventing injury or physiological damage caused by a traffic accident. Thus, a great number of seat belt assemblies have been proposed hitherto for this purpose. Most of the seat belt assemblies now proposed are provided with a seat belt retractor which is cooperated with an electromagnetic plunger device associated with buckle parts of the seat belt and is designed to enable pulling out the seat belt by the belt wearer under normal seating conditions thereby reducing the body-squeezing pressure caused by tension of the seat belt. Basically, a conventional seat belt retractor comprises a solenoid plunger, a shaft and a reel as a belt-winding device, a rachet plate simultaneously rotatable with the reel, a pawl engageable with the rachet, a spring acting in the direction of rewinding the belt and a rotatable member co-rotatable with the rachet plate under normal conditions. When a seat occupant wears a seat belt by joining the buckle parts of the belt, a switch fitted to the buckle parts is turned on to send an electric current to the solenoid whereby the rachet plate is engaged with the pawl by the action of the plunger to inhibit the rotation of the reel in the direction of rewinding the belt. In this state, the belt-rewinding force is not exerted but the rotatable member allows pulling out the belt while overcoming resistance to the force of the spring pulling back the belt to the reel. These seat belt retractors proposed heretofore which are greatly or slightly different in structure from one another satisfy the belt-protracting and -retracting functions to a certain degree but still have a number of drawbacks to be overcome.

In a seat belt retractor disclosed in Japanese Patent Publn. No. Sho. 55-51583 (U.S. Pat. No. 4,172,568), for example, the belt rewinding device comprises a shaft 6 (28 in the U.S. patent) and a reel 18 (26) while the rachet plate and the pawl are constructed by a disk rachet 25 (a rachet wheel 60) and a stopper 40 (a lever 92), respectively. The stopper 40 (the lever 92) is engageable with the disk rachet 25 (the rachet wheel 60) by the action of a solenoid 44 (an electric actuator 102). The rotatable member is constructed by an external gear 30 (a planetary gear 64) and is connected to the disk rachet 25 (the rachet wheel 60) by a spring 35 (a spring 78) in such manner that a stud 33 (68) may be engaged with the end 28 (70a) of a slot 28 (70) formed in the external gear 30 (64) by the action of the spring 35 (78). An eccentric part 22 (an eccentric bearing portion 58) of the reel 18 (26), the external gear 30 (the planetary gear 64) and an internal gear 36 (84) form a cycloid revolution-decreasing mechanism. In this seat belt retractor, the locus of the movement of the external gear 30 (the planetary gear 64) in the cycloid revolution-decreasing mechanism, especially the locus of the movement of the stud 33 (68) in the slot 28 (70) in the event the disk rachet 25 (the rachet wheel 60) is stopped by engagement with the stopper 40 (the lever 92), depicts a hypoinferior-trochoidal curve thereby generating a reverse component moving in the opposite direction to the generally progressing direction. Thus, the position of the stud 33 (68) at the end 28b (70a) tends to migrate, resulting in such a drawback that the memory position of the seat belt may fluctuate to impart uncomfortable pressure to the belt wearer.

Japanese Patent Publn. Nos. Sho. 56-3060 and 56-41258 (U.S. Pat. No. 4,228,971) disclose seat belt retractors improved in this respect. The retractor disclosed in the former publication is designed to have such a structure that a stud 25 (44) is located in a projected position (42b) outside the addendum circle of the external gear 20 (42) so that the locus of the stud in a slot 22 (40b) of a disk rachet 20 (a rachet wheel 40) may depict a hyposuper-trochoidal curve to prevent the generation of the above mentioned reverse component. The other one disclosed in the latter publication is designed to have such a structure that a plurality of studs 25a, 25b and 25c (44'a, 44'b and 44'c) positioned in projections (42'b-a, 42'b—b and 42'b-c) and a plurality of slots 22a, 22b and 22c (40'b-a, 40'b—b and 40'b-c) are so arranged that at least one stud may be brought into contact with the ends of the slots in a position other than that where the reverse component is formed. As compared with the seat belt retractor disclosed in Japanese Patent Publn. No. Sho. 55-51583, these seat belt retractors can determine the memory position exactly but have a drawback that the length of the seat belt capable of being pulled out beyond the memory position is limited so that the seat occupant cannot move his body freely after wearing the seat belt.

On the other hand, an improvement is also proposed to increase the length of the seat belt pulled out beyond the memory position. In a seat belt retractor disclosed in Japanese Laid-open Patent Appln. No. Sho. 54-100023 (U.S. Pat. No. 4,199,172), a shaft 2 (20) corresponding to the reel and a carrier 24 (a discal carrier 70) corresponding to the rotatable member are constructed to form a revolution-decreasing (i.e. reduction gear) mechanism wherein a planetary gear is used intermediately. More precisely, this revolution-decreasing mechanism comprises a sun gear 29 (84) fixed to the shaft 2 (20), a planetary gear 28 (82) supported by the carrier 24 (the discal carrier 70) and engaged with the sun gear 29 (84), and a fixed internal gear 31 (86) engaged with the planetary gear 28 (82) and freely provides a revolution-decreasing ratio by properly designing the number of teeth of the gears. This mechanism enables pulling out the seat belt until the carrier 24 (the discal carrier 70) rotates by one revolution relative to a first gear 13 (an external gear 62) so that the length of the seat belt pulled out is longer than in the case of the above mentioned publications. However, this seat belt retractor has also a detrimental drawback because the belt-rewinding force is not exerted as soon as the seat occupant has worn the seat belt. On using the seat belt, the seat occupant will normally pull out the seat belt in a slight excess for facilitating his buckling operation. In such case, the seat belt is fastened in a somewhat loosened state and the position where the belt-rewinding force is cancelled is memorized in this state, thus resulting in a danger that the belt wearer may not sufficiently be restrained with the seat belt when any emergency such as a crash occurs.

Recently, seat belt retractors further improved to overcome the above drawbacks are proposed in Japanese Laid-open Patent Appln. No. Sho. 56-128248 and Japanese Laid-open Patent Appln. No. Sho. 56-124532 (U.S. Pat. No. 4,456,196). In the seat belt retractor disclosed in the first mentioned publication, (A) a rewinding mechanism (for preventing the loosening of the seat belt) is constructed by a disk 3, a friction plate 4, a stopper pin 14, a spring 6, a stopper arm 10 and a rotation-preventing stopper 8 and (B) a controlling mechanism (for the above mechanism (A)) is constructed by the stopper arm 10, the rotation-preventing stopper 8 and the stopper pin 14. In the seat belt retractor disclosed in the last mentioned publication, the mechanism (A) is constructed by a clutch plate 8 (a clutch disk member 48), a spring 9 (a disk spring 52), a first projection 81 (a first outwardly extending arm 54) of the clutch plate 8 (the clutch disk member 48), pins 9 and 9' (stopper pins 58 and 60) and a second projection 82 (a second outwardly extending arm 56) of the clutch plate 8 (the clutch disk plate 48) among which the first projection 81 (the first outwardly extending arm 56) and the pins 9 and 9' (the stopper pins 58 and 60) comprises the controlling mechanism (B). In these seat belt retractors, the seat belt can be pulled out beyond the memory position while the loosened excessively pulled out seat belt or slack can be rewound so that most of the drawbacks mentioned above are overcome. Fully required for the seat belt retractors of this type under normal seating conditions are exact memory of a position of the seat belt where the belt-rewinding force is cancelled and free forward or backward movement (protraction or retraction) of the seat belt from/to the memory position for preventing any loosening of the seat belt and assuring free movement of the user once he has worn the seat belt. However, all of the above requirements are not fully satisfied even by the seat belt retractors of the lastly mentioned type over all the possible occasions encountered under the normal seating conditions. When a seat occupant removes the position of his seat in forward or backward direction after wearing the seat belt, there may be a situation wherein he may feel body-squeezing pressure caused by belt tension since the position of the seat belt where the belt-rewinding force is cancelled has been memorized before removal of the seat. For example, the seat belt retractor disclosed in Japanese Laid-open Patent Appln. No. Sho. 56-124532 (U.S. Pat. No. 4,456,196) changes from the state as shown in FIG. 7 immediately to the state as shown in FIGS. 9 and 2 after wearing the seat belt whereby the position of the seat belt where the belt-rewinding force is cancelled is memorized. When the seat is moved forward while the seat belt retractor is in the state as shown in FIG. 7, a certain length of the seat belt is pulled out beyond the memory position so that the retractor changes not to the state as shown in FIG. 8 but to the state as shown in FIGS. 9 and 2. After the seat has been moved forward, therefore, the belt-rewinding force is exerted by the action of the memory spring 8' (a spiral spring 46) to the seat belt up to the position where the belt-rewinding force is cancelled which has been memorized prior to the movement of the seat. Thus, an increased belt tension is applied to the belt wearer after he has moved the seat. In view of the above situations, a new function is required for the seat belt retractors, which enables them to determine the memory position by pulling out the belt after wearing the seat belt, retracting the belt and then pulling it out again. In connection with the above, a second new function is required for the seat belt retractor. The seat belt retractor must be able to determine the memory position of the seat belt at the finally fastened stage, when the seat occupant once fastened the seat belt but unfastened and again fastened it for some reason. In the seat belt retractor disclosed in the above mentioned Japanese Laid-open Patent Appln. No. Sho. 56-124532 (U.S. Pat. No. 4,456,196), for example, the memory position is determined in the state as shown in FIG. 2. When the seat belt is taken off and again fastened immediately, or in other words, when a switch for a solenoid plunger 14 (a solenoid 92) is once turned off and again turned on immediately, a stopper 13 (a pawl member 62) is removed in the right direction in the drawing and again removed in the left direction whereby the engagement of a nail 10 (a detent 64) with an external gear 7 (an annular rachet wheel 38) may be kept throughout the operations. In particular, when the belt-wearing operation is repeated immediately, such engaged state is kept continuously so that the position determined at the initial wearing operation is again memorized even after the second wearing operation. It is a matter of course that the belt-rewinding force applied to the belt wearer is changed in such case. This phenomenon is remarkable when the external gear 7 (an annular rachet wheel 38) has a rachet structure as seen in the seat belt retractor of this example since the rotation of the external gear 7 (the annular rachet wheel 38) in the belt-rewinding direction is disturbed by the nail 10 (the detent 64) acting in the direction of inhibiting the rotation of the external gear so that the external gear and the nail are not easily released from engagement.

As is evident from the foregoing description and comparison, the seat belt retractor disclosed in Japanese Laid-open Patent Appln. No. Sho. 56-124532 (U.S. Pat. No. 4,456,196) belongs to the most advanced type but still further improvements are found necessary therefor in view of the above mentioned drawbacks and incorporation of the two new functions into its tension eliminating mechanism is also required for the seat belt retractor of this type. In the practical aspect, therefore, there is a great demand for developing a seat belt retractor which is improved fully in its tension eliminating mechanism and satisfactorily overcomes the above mentioned drawbacks.

BRIEF SUMMARY OF THE INVENTION

Accordingly, it is an object of the present invention to provide a seat belt retractor having an improved tension eliminating mechanism.

It is another object of the present invention to provide an improved seat belt retractor wherein all of the drawbacks seen in the prior art seat belt retractors are completely overcome.

It is further object of the present invention to provide a seat belt retractor which enables pulling out the seat belt freely under normal seating conditions and rewinding an excess length of the seat belt to the memory position previously determined, so as to relieve the belt wearer from body-squeezing pressure caused by tension of the seat belt.

It is still another object of the present invention to provide an improvement in both a tension eliminating mechanism and a cycloid revolution-decreasing mechanism of a seat belt retractor, wherein a combination of a specific stopper and an external gear rotatable by a specific cycloid revolution-decreasing mechanism is used in place of a conventional combination of a rachet wheel and a pawl.

Other and further objects, features and advantages of the present invention will become apparent more fully from the following description.

DETAILED DESCRIPTION OF THE INVENTION

As a result of the present inventors' further study on the tension eliminating mechanism, it has now been found that the drawbacks seen in the prior art seat belt retractors are all overcome by using (a) a combination of an external gear and a teeth-arranged stopper in place of a combination of a rachet wheel and a pawl, (b) a friction plate with a specific stopper-controlling device and (c) a specific cycloid revolution-decreasing mechanism.

In accordance with the present invention, there is provided a seat belt retractor comprising a main body, a spindle rotatably journaled to the main body and having a seat belt wound around the outer periphery thereof, a rewinding spring capable of imparting rotation force in the belt-rewinding direction to the spindle, a rotatable member engaged by way of a cycloid revolution-decreasing mechanism to the spindle, an external gear engaged with the rotatable member by way of an auxiliary spring and restricted in its rotating range relative to the rotatable member, a friction plate coupled to the rotatable member so as to be driven frictionally in reciprocal directions within a limited range, a stopper having teeth formed at the top end thereof for engaging with the external gear to inhibit the rotation of the external gear, a spring biasing the stopper in the direction of disengaging from the external gear, a lever capable of allowing the stopper to engage with and disengage from the external gear, and a solenoid plunger associated with a switch in buckle parts fitted to the seat belt, the friction plate having a pair of spaced first and second projections and a recess formed therebetween with an inclined edge for controlling the movement of the stopper in such manner that when the solenoid plunger is not actuated, the stopper is located in a non-engaging position to the external gear to enable freely pulling out and rewinding of the seat belt. When the solenoid plunger is actuated by the operaion of the buckle parts, the first projection or the inclined edge of the friction plate inhibit the stopper from engaging with the external gear to enable rewinding any loosened excessive length or slack of the seat belt pulled out, and when the seat belt is again pulled out in this state, the stopper engages with the external gear and the lever maintains the engaged state to inhibit the spindle from rotating in the belt-rewinding direction by way of the auxiliary spring, the rotatable member and the cycloid revolution-decreasing mechanism but to permit the rotation in the direction of pulling out the seat belt while tightening the auxiliary spring.

The present invention can more fully be understood from the following description taken in conjunction with the accompanying drawings in which.

Figure 1:
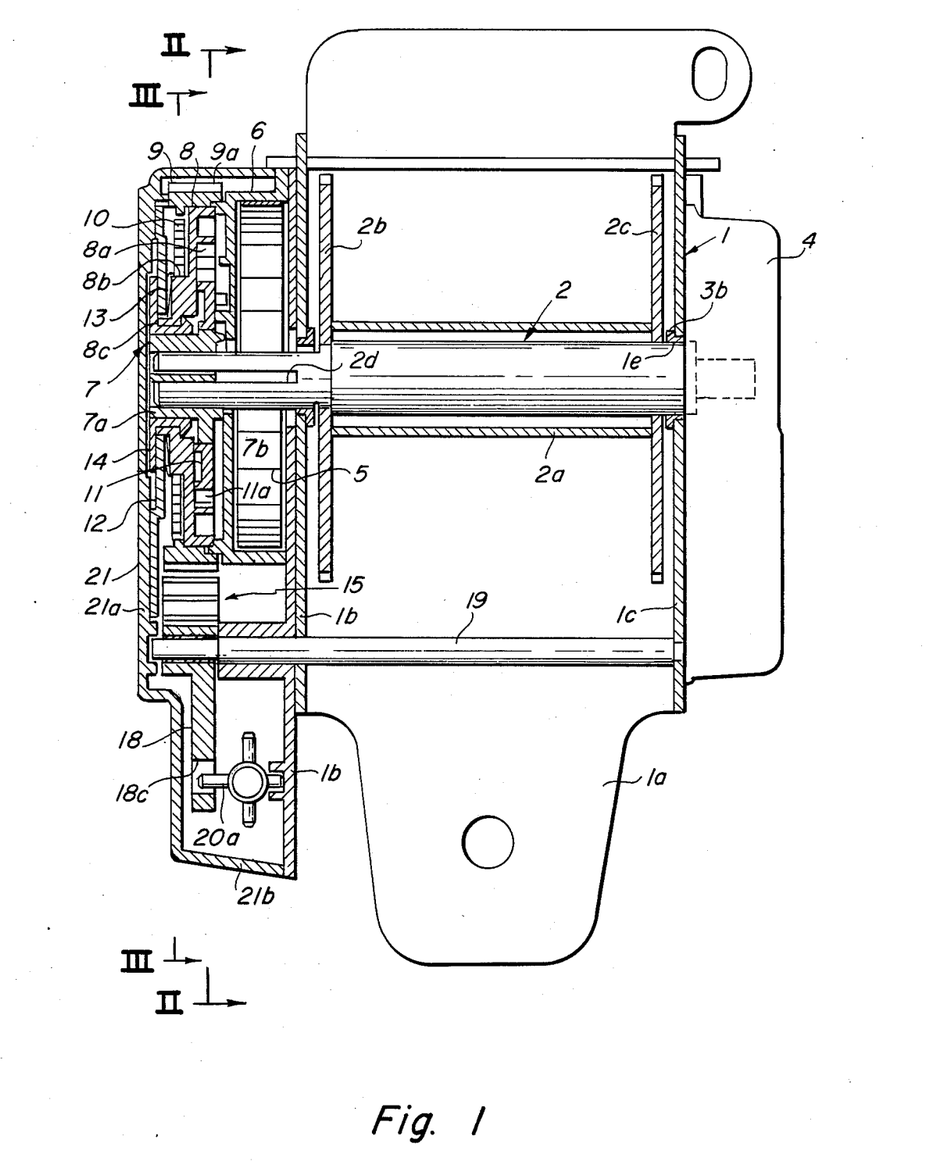
FIG. 1 is a longitudinal cross sectional view of a typical example of the seat belt retractor of the present invention cut at a central part.
Figure 2:
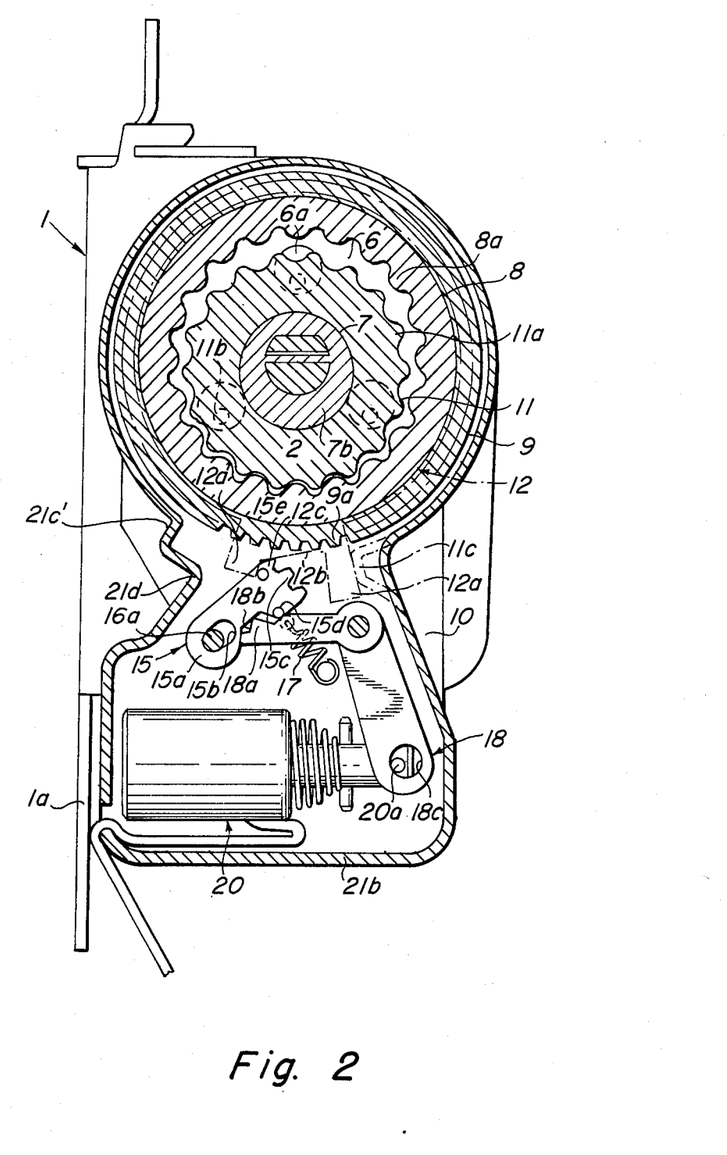
FIG. 2 is a cross sectional view of the seat belt retractor cut along a line II—II in FIG. 1.
Figure 3:
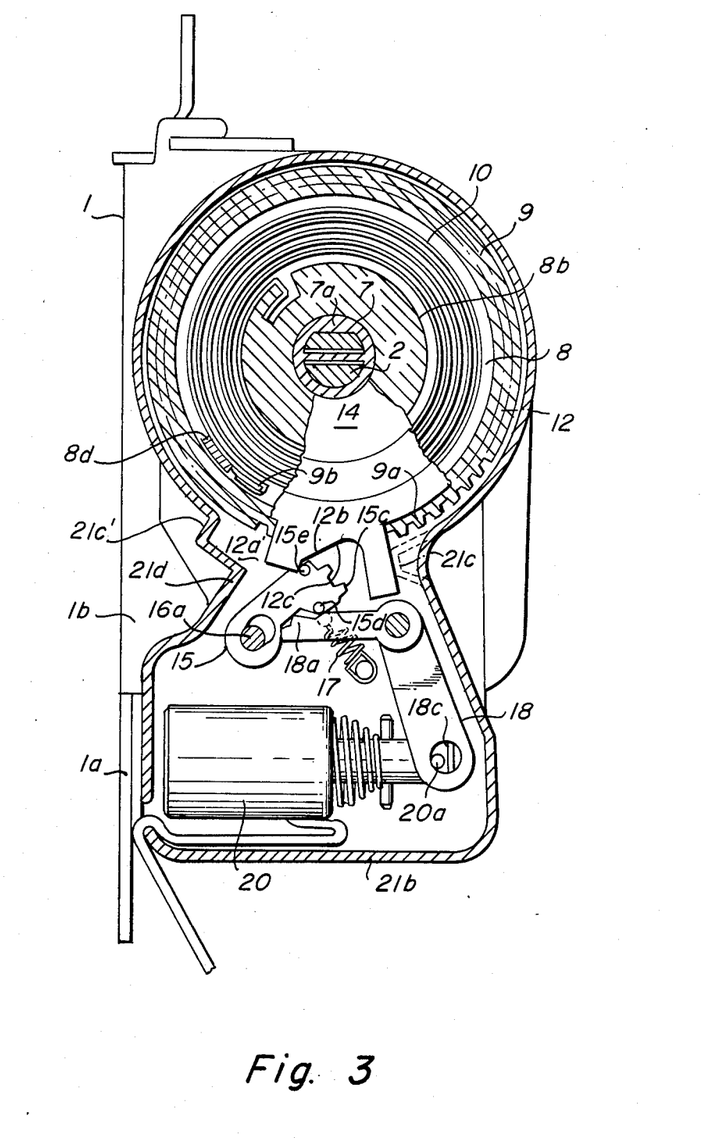
FIG. 3 is a cross sectional view of the seat belt retractor cut along a line III—III in FIG. 1.

Referring to the drawings, especially FIGS. 1-3 showing a main part of the seat belt retractor of the present invention, a main body 1 comprises a bottom plate 1a, a pair of side plates 1b and 1c disposed vertically on opposite edges of the bottom plate 1a and a shaft receiving holes 1d and 1e perforated at the center of the side plates 1b and 1c, respectively. A spindle 2 is rotatably journaled on its opposite ends to the shaft receiving holes 1d and 1e of the side plates 1b and 1c by way of bushes 3a and 3b. At the central portion the spindle 2 is engaged with a sleeve 2a, and flanges 2b and 2c are disposed on the opposite ends of the sleeve 2a so that they are rotated together with the spindle 2. A seat belt (not shown) is wound on the sleeve 2a in clockwise direction in FIG. 2 or 3. The spindle 2 is extended on both ends thereof from the side plates 1b and 1c with a slot 2d and a notch 2e being formed on one end thereof. In addition, an emergency locking mechanism (not shown) is arranged at the other side and enclosed within a cover 4. A rewinding spring 5 is contained within a spring casing 6 which is secured to the outer surface of the side plate 1b, and is engaged on its outer end with the inner circumference of the spring casing 6 and on its inner end with the slot 2d of the spindle 2 to impart rotation force to the spindle 2. Three or more recesses 6a are formed on the outer surface of the spring casing 6.

A cam shaft 7 is mounted to the top end of the spindle 2 and adapted to rotate together with the spindle 2 by means of the slot 2d and the notch 2e. The cam shaft 7 comprises a shaft portion 7a coaxial with the spindle 2 and a circular cam portion 7b eccentric therewith. A disk-like rotatable member 8 is freely rotatably engaged with the shaft portion 7a. The rotatable member 8 has inner teeth 8a on the inner surface thereof, a stepped portion 8b on the outer surface and a short cylindrical portion 8c protruded from the inner end of the outer surface. An external gear 9 is rotatably engaged with the rotatable member 8 and has external teeth 9a formed on the outer circumference thereof. Stoppers 9b and 8d protrude respectively on the inner circumference of the external gear 9 and on the outer surface of the rotatable member 8 in positions abutting against each other so as to restrict the relative angular movements between the rotatable member 8 and the external gear 9. An auxiliary spiral spring 10 weaker than the rewinding spring 5 is provided between the inner circumferential surface of the external gear 9 and the stepped portion 8b of the rotatable member 8 and imparts rotation force to the rotatable member 8 relative to the external gear 9 in the belt-rewinding direction to abut the stoppers 8d and 9b against each other.

The cycloid revolution-decreasing mechanism used in the seat belt retractor of the present invention is apparent from FIG. 2 wherein a planet gear 11 is rotatably engaged with the cam portion 7b of the cam shaft 7 and has external teeth 11a formed on the outer circumference thereof for engaging with the inner teeth 8a of the rotatable member 8. Three projections 11b protrude on the inner surface of the planet gear 11 and are attached onto the side wall of the three circular recesses 6a of the spring casing 6 so that the planet gear 11 swings at a definite position without being rotated when the spindle 2 is rotated. In this case, the movement of the swinging planet gear 11 is shown by a locus of each projection 11b in each circular recess 6a depicting a circle along the periphery of the circular side wall of the recess 6a. Thus, the rotatable member 8 is rotated by one tooth at every swing of the planet gear 11 so that the number of revolutions of the rotatable member 8 is significantly decreased as compared with that of the spindle 2.

The outermost element mounted on the spindle 2 is a friction plate 12 rotatably engaged to the short cylindrical portion 8c of the rotatable member 8 and coupled to the outer side surface of the rotatable member 8 so as to be moved therewith by means of frictional force. This coupling is maintained by a bush 14. The friction plate 12 is generally in the form of a disk and has a first control projection 12a, a recess 12b, a second control projection 12a' and an inclined edge 12c formed between the recess 12b and the second control projection 12a'. In appearance, either of the recess 12b and the second control projection 12a' has the inclined edge 12c.

A stopper 15 which constitutes the tension eliminating mechanism together with the external gear 9 has a long slot in a base portion 15a thereof and is journaled to a pin 16a provided on a base plate 16 secured onto the outer side surface of the side plate 1b rotatably around the pin 16a and slidably along the long slot 15b. The stopper 15 is always biased to rotate in the clockwise direction by a spring 17. Teeth 15c capable of engaging with the external teeth 9a of the external gear 9 are formed on the top end of the stopper 15 so as to engage with the external teeth 9a when the stopper 15 rotates in the counter-clockwise direction. Further, pins 15d and 15e cooperable with the first and second control projections 12a and 12a' for controlling the rotation of the external gear 9 are provided on the outer surface of the stopper 15.

A bellcrank lever 18 for actuating the stopper 15 is pivotably provided at its center through a shaft 19 on the housing 1. An actuation part 18a is formed at its top end for abutting against the side edge of the stopper 15 to swing it. A recessed support section 18b is formed on the top end of the actuation part 18a. In addition, an aperture 18c is formed on the rear end of the lever 18.

A solenoid plunger 20 is fixed to the housing 1 and is provided at the front end thereof with a pin 20a which is inserted into the aperture 18c of the lever 18. The solenoid plunger 20 is controlled by a switch fitted to or incorporated in buckle parts (not shown) for fastening the seat belt.

A cover 21 is shaped in a box-like form with a cover plate 21a and a side plate 21b. The side plate 21b is intruded inwardly in one or two positions to form either or both of bumping parts 21c and 21c' which abut against the first and second control projections 12a and 12a', respectively, of the friction plate 12 to restrict the rotation range of the friction plate 12. Alternatively, the cover 21 may be provided with one or two projections inwardly extending from the position or positions corresponding to the place where the bumping part 21c and/or 21c' is formed. If desired, for example, a combination of the bumping part 21c and a projection inwardly extending from a position of the cover plate corresponding to the place where the bumping part 21c' is to be formed may be selected for the purpose of restricting the rotation range of the friction plate 12. Another part 21d of the side plate 21b is positioned closer to the stopper 15 so as to restrict the rotation range thereof.

For better understanding of the operation of the seat belt retractor of the present invention, a detailed explanation will be given hereinafter on the individual successive stages with reference to the illustrations shown in the drawings.

In FIGS. 1-3, the seat belt retractor is in the initial or original state where the retractor is not yet used. Under such conditions, the solenoid plunger 20 is not actuated and keeps the lever 18 rotated in the counter-clockwise direction whereby the stopper 15 is rotated clockwise by the action of the spring 17 lest the teeth 15c of the stopper 15 would be engaged with the external teeth 9a of the external gear 9.

Figure 4:
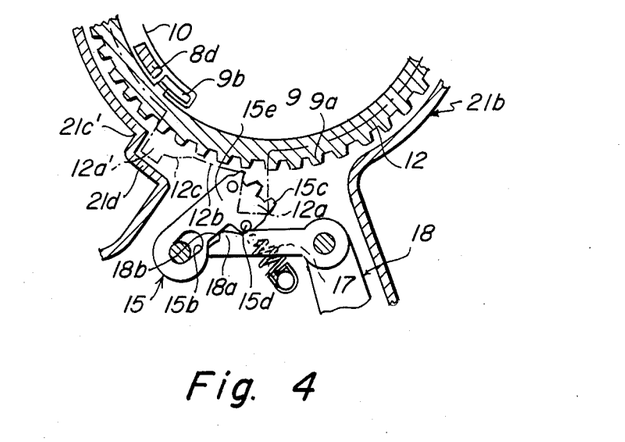
FIGS. 4-9 are a series of partial cross sectional views of the seat belt retractor cut along a line III—III showing the process of the operation, especially the actuation of the friction plate and the stopper in order.

FIG. 4 shows the relation between the stopper and the first and second control projections at the first stage of the operation where the seat belt is pulled out of the retractor in the state shown in FIGS. 1-3. When the seat belt is pulled out in this stage, the spindle 2 rotates in the clockwise direction as seen in FIG. 2 while tightening the rewinding spring 5. Thus, the cam shaft 7 rotates together with the spindle 2 whereby the planet gear 11 engaged with the cam portion 7b of the cam shaft 7 swings relative to the body 1 without rotation. In this case, the movement of the swinging planet gear 11 is shown as a locus of the projections 11b moving along the circular side wall of the recesses 6a. The cycloid revolution-decreasing mechanism actuates at this stage and the rotatable member 8 rotates in the clockwise direction at a low speed (moving by one tooth per swing of the planet gear 11). As the rotatable member 8 rotates, the external gear 9 coupled by way of the auxiliary spiral spring 10 to the rotatable member 8 and the friction plate 12 coupled to be driven by the frictional force of the friction spring 13 rotate together with the rotatable member 8. However, the friction plate 12 abuts at its first control projection 12a against the pin 15e on the stopper 15 or an upright edge 12d of the second control projection 12a' abuts against a bent bumping part 21c' formed on the side plate 21b of the cover 21, whereby the rotation of the friction plate 12 is stopped. In this state, the first control projection 12a of the friction plate 12 comes very close above the pin 15d of the stopper 15 in the drawing, while the spindle 2 can rotate in either belt-rewinding or belt-feeding direction.

When buckle parts (not shown) are operated after pulling out the seat belt, a switch fitted to the buckle parts is turned on to energize the solenoide plunger 20 whereby a force is applied to the lever 18 so as to turn it in the clockwise direction. As shown in FIG. 4, however, the friction plate 12 has remained in a position rotated in the clockwise direction and the pin 15d on the stopper 15 has almost abutted against the top end of the first control projection 12a on the friction plate 12. Thus, the stopper 15 cannot rotate in the counter-clockwise direction and each of the related members does not move substantially from the state shown in FIG. 4. In this state, protraction or retraction of the seat belt can freely be made and a position where the belt-rewinding force is cancelled is not yet memorized so that the belt wearer can move freely while fastening the belt.

Figure 5:
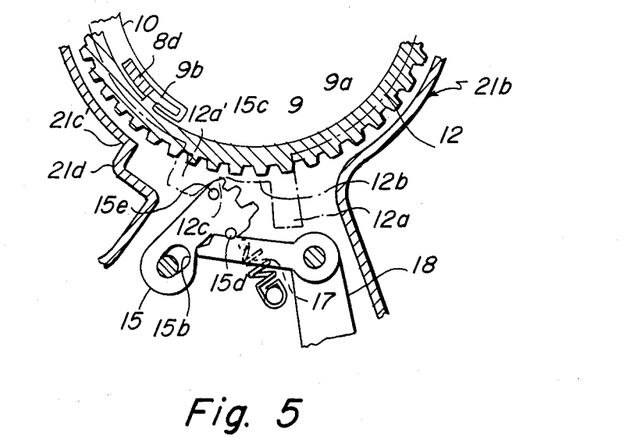

FIG. 5 shows the relation of the stopper and the first and second control projections at the second stage of the operation where a loosened excessive length of the seat belt is pulled back after fastening the seat belt.

When an excessive length of the seat belt is pulled back, the seat belt is rewound around the spindle 2 by resiliency of the rewinding spring 5 to permit the spindle 2 to rotate in the counter-clockwise direction. Accordingly, the rotatable member 8 is also rotated slowly in the counter-clockwise direction by means of the cycloid revolution-decreasing mechanism contrary to the case of pulling out the seat belt, whereby the external gear 9 and the friction plate 12 are also rotated together with the rotatable member 8.

In this case, the first control projection 12a on the friction plate 12 is detached from the pin 15d on the stopper 15 whereby the stopper 15 is rotated in the counter-clockwise direction. However, the friction plate 12 is rotated to bring the second control projection 12a' into contact with the pin 15e of the stopper 15 whereby the pin 15e is moved in compliance with the profile of the inclined edge 12c to push down the position of the stopper 15 relative to the external gear 9, while permitting the rotation of the stopper 15 in the clockwise direction. Thus, the teeth 15c on the stopper 15 are held in a position not engaging with the external teeth 9a on the external gear 9. When the spindle 2 is rotated to rewind the seat belt, no unpleasant gear noise is produced between the external gear 9 and the stopper 15.

Figure 6:
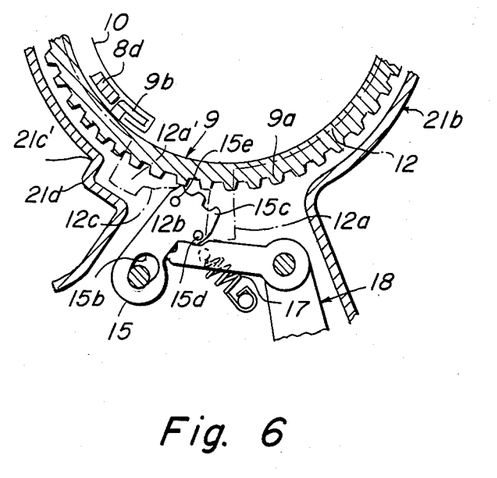
Figure 7:
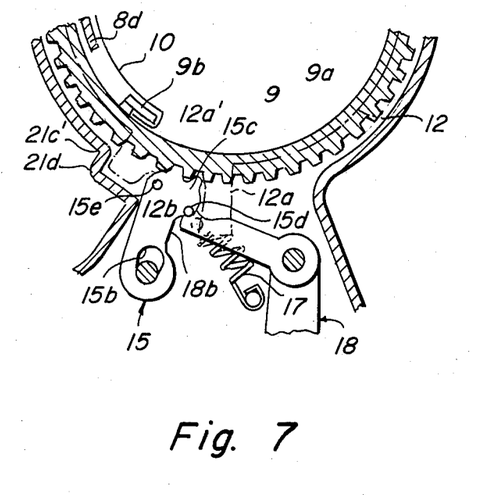

FIGS. 6 and 7 each shows the relation between the stopper and the first and second control projections at the third stage of the operation where the seat belt is again pulled out while fastening the seat belt. FIG. 6 shows the former half of the third stage and FIG. 7 shows the latter half of the third stage of the operation.

When the seat belt is again pulled out slightly successive to the second stage, the spindle 2 is rotated in the clockwise direction in the manner as described above to rotate the rotatable member 8, the external gear 9 and the friction plate 12 at a low speed. In this case, a rotation force acting in the counter-clockwise direction is exerted to the stopper 15 by the lever 18 driven by the solenoid plunger 20 to permit the pin 15e to slide along the inclined edge 12c of the friction plate 12 whereby the stopper 15 is rotated in the counter-clockwise direction and falls into the recess 12b. The teeth 15c on the stopper 15 take a position capable of engaging with the external-teeth 9a of the external gear 9. As the stopper 15 is rotated in the counter-clockwise direction by the rotation of the external gear 9, the teeth 15c come to engagement with the external teeth 9a. On the other hand, a rotation force in the clockwise direction is exerted to the lever 18 by the action of the plunger 20. In case the stopper 15 is rotated in the counter-clockwise direction as described above, the lever 18 is also rotated in the clockwise direction by the action of the plunger 20 whereby the stopper 15 is supported on the support portion 18b of the lever 18 and inhibited to rotate in the clockwise direction again. In this state, the stopper 15 abuts against a portion 21d of the cover 21 and is also inhibited from an excess rotation in the counter-clockwise direction. As shown in FIG. 7, therefore, the stopper 15 is maintained in a position where the teeth 15c are engaged with the external teeth 9a of the external gear 9. A memory of the position where the belt-rewinding force is cancelled is attained at this stage. Since the external gear 9 engaging with the stopper 15 cannot be rotated, the rotation of the rotatable member 8 is stopped and, further, the rotation of the spindle 2 through the planet gear 11 and the cam shaft 7 is also inhibited. Consequently, the belt-rewinding force is not exerted any more to the seat belt to prevent the belt wearer from body-squeezing pressure caused by tension of the seat belt.

When the belt is pulled out in response to the movement of the belt wearer's body, at this stage, the rotatable member 8 is rotated in the clockwise direction at a low speed but the external gear 9 can be rotated no more as the external teeth 9a are engaged with the stopper 15, whereby the rotatable member 8 and the external gear 9 are rotated relatively to each other while tightening the auxiliary spiral spring 10 as shown in FIG. 7. Accordingly, it is possible to pull out the seat belt from the retractor, and as the result, the belt wearer can move freely while putting on the seat belt.

Figure 8:
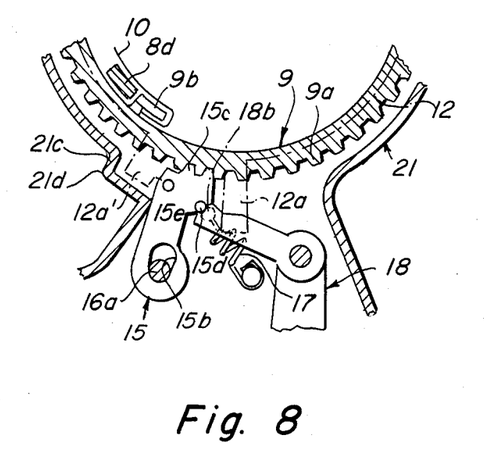

FIG. 8 shows the relation between the stopper and the first and second control projections at the fourth stage of the operation where the seat belt is rewound successively to the third stage of the operation.

When the seat belt is rewound by the action of the rewinding spring 5 in response to the movement of the belt wearer's body in the state as shown in FIG. 7, the spindle 2 is rotated in the counter-clockwise direction and the rotatable member 8 is also rotated in the same direction at a reduced revolutional speed. As described above, however, the external gear 9 engaging with the stopper 15 is not rotated. Thus, the rotatable member 8 is rotated relative to the external gear 9 by the action of the auxiliary spiral spring 10. When the seat belt is rewound up to the memorized or recalled normal belt-wearing state before the second protraction of the seat belt as described above with reference to FIGS. 6 and 7, the stopper 8d on the rotatable member 8 and the stopper 9d on the external gear 9 abut against each other, whereby both of the rotatable member 8 and the external gear 9 can no longer be rotated relative to each other. This means that the belt-rewinding force exerted to the seat belt pulled out is cancelled in the previously determined memory position. Thus, the belt wearer is prevented from body-squeezing pressure caused by any excessive rewinding of the seat belt beyond the memory position. Furthermore, the seat belt is smoothly pulled out in compliance with the movement of the belt wearer's body so that the belt wearer does not feel body-squeezing pressure in this case.

Figure 9:
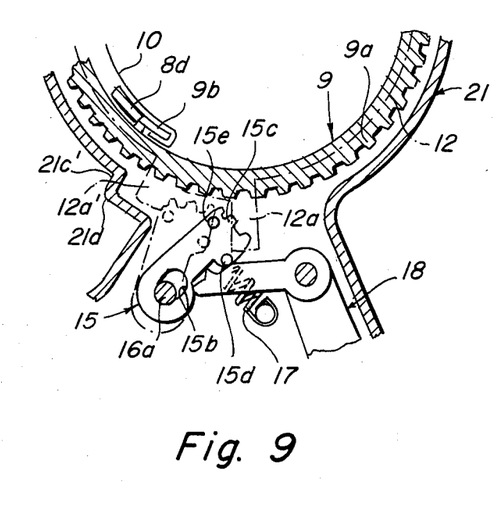

FIG. 9 shows the relation between the stopper and the first and second control projections at the fifth stage of the operation where the seat belt is unfastened in the normal belt-wearing state.

When the belt wearer unfastens the seat belt successively to the preceding stage, the solenoid plunger 20 is deenergized with the result that the lever 18 is rotated in the counter-clockwise direction again. It follows that the stopper 15 is soon freed from the support by the lever 18 and disengaged from the external gear 9 in such manner that the long slot 15b immediately slides down through the pin 16a by the resiliency of the spring 17 as shown by dash and dot lines in FIG. 9 whereby the stopper 15 moves downward and the teeth 15c disengages out of the external teeth 9a. Successively, the stopper 15 is rotated in the clockwise direction by the resiliency of the spring 17 to release the engagement between the stopper 15 and the external gear 9 entirely. This state is shown by solid lines in FIG. 9.

On the other hand, the external gear 9 becomes rotatable relative to the main body 1 and the force for inhibiting the rotation of the spindle 2 is cancelled in conjunction with the rapid disengagement between the stopper 15 and the external gear 9. Accordingly, the spindle 2 soon becomes rotatable in either the clockwise or counter-clockwise direction while undergoing the resiliency of the rewinding spring 5, thus enabling to pull out or rewind the seat belt whereby the seat belt retractor is reinstated to the initial stage of the operation, i.e. the state as shown in FIGS. 2 and 3.

In the seat belt retractor of the present invention, the spindle 2 is freely rotatable in use of pulling out the seat belt or rewinding an excess length of the seat belt after fastening it by means of buckle parts so that the seat occupant can put on the seat belt correctly. The seat belt retractor of the present invention is featured by a specific tension eliminating mechanism using a further control projection in addition to a conventional control projection and bringing these projections into cooperative operations so that the "lock" of the belt-rewinding force is exerted by slightly pulling out the seat belt in the normally wearing state to cancel the belt-rewinding force applied to the seat belt in the correct belt-wearing position, whereby the belt wearer's uncomfortable feeling of squeezing pressure can be minimized and the seat belt can freely be pulled out to enable the belt wearer to move freely within a vehicle. As the normal belt-wearing position of the seat belt is determined by the second protraction of the seat belt and is always memorized or recalled, the seat belt-excessively pulled out can be rewound up to the normal wearing-position where the belt-rewinding force is cancelled without permitting any loosening of the seat belt and without giving the belt-wearer any uncomfortable body-squeezing pressure by excess tension, even in the event the seat belt is unconsciously pulled out while being fastened.

Since the stopper 15 is journaled at the long slot 15b to the pin 16a and is made slidable relative to the pin 16a in the longitudinal direction of the long slot 15b, the stopper 15 is instantaneously disengaged from the external gear 9 to reinstate the state of the seat belt retractor to the initial stage as shown in FIG. 2 or 3 when the seat belt is unfastened by disconnecting the buckle parts.

As the seat belt retractor of the present invention employs a combination of a gear wheel (the external gear 9) and a gear-teeth stopper (the stopper 15) as elements for the tension control, the gear rotatable in reciprocal (clockwise or counter-clockwise) directions can effectively be inhibited, unlike the case of using a combination of a rachet wheel and a pawl which is effective for inhibiting the rotation in one direction. The stopper 15 preferably has 2 or more teeth engageable with the teeth of the external gear 9 to assure complete engagement between both. Moreover, the use of the long slot 15a in the stopper 15 is suitable for disengaging it from the external gear 9 in a radially departing direction from the spindle 2 so that the disengagement of the stopper from the external gear is achieved almost instantaneously. The function of the long slot in the present invention is to achieve prompt disengagement between the gear and the stopper and does not generally participate in the "lock" mechanism of the stopper and the control projections. Thus, the function of the long slot 15a is quite different in the purpose from a similar one in the prior art seat belt retractors.

The cycloid revolution-decreasing mechanism (the so-called reduction gear mechanism) used in the seat belt retractor of the present invention is not proposed in any of the publications mentioned hereinbefore. This cycloid revolution-decreasing mechanism is smaller in size than a similar one, for example, used in Japanese Laid-open Patent Appln. No. Sho. 56-124532 (U.S. Pat. No. 4,456,196) wherein an intermediate planetary gear is interposed between a sun gear mounted concentrically to a central spindle and an internal gear, and is efficient and accurate in function. In the cycloid revolution-decreasing mechanism used in the present invention, the planet gear is engaged with the cam portion of the cam shaft and has external teeth engageable with the internal teeth of the rotatable member and at least 3 projections or studs arranged on the inner surface thereof in such manner that they stand on a circle concentric with the eccentric cam shaft. If the number of the projections or studs is 3, each of them is arranged at an angle of 120°. If the number is 4, each is arranged in a similar manner at an angle of 90°. In this case, the same number of circular recesses corresponding to the projections or studs are formed on the side wall of the spring casing to receive them. These circular recesses are arranged in such manner that they are formed on the side wall with their central points on a circle concentric with the spindle. The diameter of the circular recess is equal to the span in swing of the planet gear and the locus of the swinging planet gear at each projection or stud corresponds to the periphery of each circular recess. As in the case of the projections or studs, the three recesses are arranged at an angle of 120°. As the swing of the planet gear is guided by a plurality of projections or studs, the revolution-reducing function is attained accurately. If desidred, the relation between the projections or studs and the recesses can be inverted. For example, at least 3 recesses may be formed on the inner surface of the planet gear while at least 3 but the same number as the recesses of projections or studs may be formed on the side wall of the spring casing.

The seat belt retractor of the present invention characterized by a combination of the specific tension eliminating mechanism provided with two control projections for a stopper and the specific cycloid revolution-decreasing mechanism is outstanding in the function of eliminating excess tension, the determination of memory position and the accuracy of the operation and succeeds in overcoming all of the drawbacks seen in the prior art seat belt retractors. Thus, the seat belt retractor of the present invention is particularly useful in the motor-vehicle industry.

What is claimed is:

1. A seat belt retractor contained within a housing and a cover for said retractor which allows a seat belt and associated buckling parts to be extended while absorbing slack, and further includes a device for recalling the position of the seat belt when the belt-rewinding force is canceled, said retractor comprising:
   a spindle having a surface disposed within said housing;
   a rewinding spring operatively associated with said spindle, said seat belt being rewound onto the spindle surface which rotates in a belt rewinding direction due to the resiliency of said rewinding spring;
   a rotatable member;
   means engaged with said rotatable member and said spindle for decreasing the number of revolutions of the rotatable member relative to that of the spindle;
   external gear operatively associated with said rotatable member by way of an auxiliary spring, said external gear having a limited rotation range relative to the rotatable member and having square teeth on the outer periphery thereof;

a stopper having a body with at least two square teeth on the top end thereof which rotates so as to engage or disengage said square teeth of said stopper with the square teeth of the external gear, said stopper having a long slot formed in said body at the center of rotation of said stopper so as to be slidably movable along said slot;

a lever which rotates the stopper so as to engage said stopper teeth with the teeth of the external gear, said lever supporting said stopper when the stopper teeth are engaged with the external gear;

a solenoid plunger driving the lever and maintaining said engagement when energized upon connection of said seat belt buckling parts;

a friction plate frictionally coupled to the rotatable member so as to allow said plate and member to rotate together; and a first control projection provided on the outer periphery of said friction plate which inhibits the engagement of the stopper teeth with the teeth of the external gear when the solenoid plunger is energized so as to allow rewinding of said seat belt slack, said friction plate having a second control projection formed on the periphery thereof so as to inhibit the engagement of the stopper teeth with the teeth of the external gear before energizing the solenoid plunger, thereby allowing the seat belt to be extended.

2. The seat belt retractor according to claim 1, wherein the friction plate is restricted in its rotation range by allowing the outer edges of the control projection and the additional control projection formed on the outer periphery of the friction plate to abut against bumping parts formed in said cover for the retractor.

3. The seat belt retractor according to claim 1, wherein the inner edge of the additional control projection facing the control projection is shaped to form an inclined edge.

4. The seat belt retractor according to claim 1, wherein the stopper is provided with two pins that abut against said first and second control projections of the friction plate and inhibit the engagement of the teeth of the stopper with the teeth of the external gear when the solenoid plunger is energized.

5. The seat belt retractor according to claim 1, wherein a part of the cover abuts against the stopper when the teeth of the stopper are engaged with the teeth of the external gear, thereby supporting the rotation of the stopper in the belt-rewinding direction of the external gear.

6. The seat belt retractor according to claim 1, wherein the means connecting the rotatable member to the spindle is a cycloid revolution-decreasing mechanism, which comprises a planet gear mounted to a position eccentric with the spindle and internal teeth formed on the inner side surface of the rotatable member which engage with external teeth of the planet gear.

7. The seat belt retractor according to claim 6, wherein at least 3 projections or recesses are formed on the side surface of the planet gear with the centers therein being on a circle concentric with the eccentric axis of the planet gear and having at least 3 corresponding recesses or projections formed on the surface of an element fixed to the housing with the centers thereof being on a circle concentric with the spindle, the latter recesses or projections being capable of receiving the former projections or recesses.

8. The seat belt retractor according to claim 7, wherein the element fixed to the housing is a spring casing for the rewinding spring.

9. The seat belt retractor according to claim 2, wherein the inner edge of the additional control projection facing the control projection is shaped to form an inclined edge.

10. The seat belt retractor according to claim 2, wherein the stopper is provided with two pins that abut against said first and second control projections of the friction plate and inhibit the engagement of the teeth of the stopper with the teeth of the external gear when the solenoid plunger is energized.

11. The seat belt retractor according to claim 3, wherein the stopper is provided with two pins that abut against said first and second control projections of the friction plate and inhibit the engagement of the teeth of the stopper with the teeth of the external gear when the solenoid plunger is energized.

12. The seat belt retractor according to claim 2, wherein a part of the cover abuts against the stopper when the teeth of the stopper are engaged with the teeth of the external gear, thereby supporting the rotation of the stopper in the belt-rewinding direction of the external gear.

13. A seat belt retractor according to claim 3, wherein a part of the cover is allowed to abut against the stopper at the time of engaging the teeth of the stopper with the teeth of the external gear thereby supporting the rotation of the stopper in the belt-rewinding direction of the external gear.

14. The seat belt retractor according to claim 4, wherein a part of the cover abuts against the stopper when the teeth of the stopper are engaged with the teeth of the external gear, thereby supporting the rotation of the stopper in the belt-rewinding direction of the external gear.

* * * * *